United States Patent

Bortoli et al.

[11] Patent Number: 5,813,440
[45] Date of Patent: Sep. 29, 1998

[54] TAPE HEAD FOR A GRIPPER LOOM

[75] Inventors: Giulio Bortoli, Schio; Luciano Corain, Vicenza, both of Italy

[73] Assignee: Nuovo Pignone S.P.A., Italy

[21] Appl. No.: 806,940

[22] Filed: Feb. 26, 1997

[30] Foreign Application Priority Data

Feb. 27, 1996 [IT] Italy ............................. MI.96-A/0364

[51] Int. Cl.$^6$ ............................. D03D 47/20; B29C 45/14
[52] U.S. Cl. ............................................. 139/449; 264/273
[58] Field of Search ............................. 264/273; 139/449

[56] References Cited

U.S. PATENT DOCUMENTS

| 5,035,268 | 7/1991 | Bucher ..................................... | 139/449 |
| 5,135,033 | 8/1992 | Stacher et al. ............................ | 139/449 |
| 5,480,604 | 1/1996 | Johnson et al. ........................... | 139/449 |

FOREIGN PATENT DOCUMENTS

| 2 457 917 | 12/1980 | France . |
| 2 541 321 | 8/1984 | France . |
| 2 642 093 | 7/1990 | France . |
| 53-128676 | 11/1978 | Japan . |

*Primary Examiner*—Andy Falik
*Attorney, Agent, or Firm*—Nixon & Vanderhye P.C.

[57] ABSTRACT

A gripper loom tape head including a base, comprising a gripper support crest attached to the tape head, the tape head having a plurality of through fixing holes flared towards the base of the tape head and arranged in two longitudinal rows on one and the other side of a longitudinal axis of the tape head, which comprises two flared holes, of greater diameter than the holes, on the longitudinal axis in proximity to the longitudinal ends of the crest, characterized in that the gripper support crest is prefabricated in any desired material, is provided with a series of through fixing holes in proximity to its lower end, is arranged along the longitudinal axis of the underlying tape head perpendicular to this latter and spaced therefrom by a certain gap, and is maintained in position for all or nearly all its length by a thermoplastic injection-molding material which surrounds most of the prefabricated crest and becomes inserted into the fixing holes of this latter, into the gap between the crest and the tape head and into the flared fixing holes of this latter, including the two larger axial holes.

10 Claims, 2 Drawing Sheets

TAPE HEAD FOR A GRIPPER LOOM

BACKGROUND

This invention relates to a gripper loom tape head which, by comprising a crest formable from any type of appropriate material, including non-thermoplastic material, enables optimum wear characteristics to be achieved so as not to create roughness for the specific yarn types used.

The invention also relates to a simple and reliable injection-molding method for easy and accurate construction of such a tape head, without any danger to its necessary planarity, even if expedients for this purpose are absent, its planarity remaining reliably unaltered with time.

In gripper looms, each gripper is moved with reciprocating motion into and out of the shed formed from the warp yarns, by means of a tape, generally of stratified plastic laminate, on the head of which the gripper is locked to a support crest which is itself fixed to the tape head.

Various methods for fixing the crest to the tape are already known in the state of the art.

Such known methods consist substantially of riveting or screwing the parts together; however such fixing has various drawbacks which besides prejudicing the required planarity of the tape head, do not ensure either stable and reliable fixing or intimate contact between the head and crest, which can result in vibration detrimental to the proper operation of the gripper.

In order to obviate the drawbacks, it has been considered to effect the fixing by molding the crest directly onto the tape head. In other words, a plurality of shaped through-fixing-holes are created in the tape head, onto these there being injected thermoplastic material in a crest-shaped mold. The crest obtained in this manner is in intimate contact with the tape head and is securely fixed thereto by the infiltration of the thermoplastic molding material into the shaped through-holes in the tape head.

However, this latter solution also has drawbacks, the main drawback of which is the impossibility of free choice of the crest material, as would be necessary to achieve optimum rubbing wear resistance of the crest so as not to create roughness against specific types of yarn used, given that the material has to be a thermoplastic material. In this respect, as is well known to the expert of the art, the crest is always subject to wear by rubbing against the warp yarns, which can create on the crest such roughness as to damage, if not break, the yarns themselves. It is not possible, however, to use other than thermoplastic materials for the purpose of achieving greater rigidity.

Again, during molding, account must always be taken of the shrinkage of the thermoplastic material during its solidification, this shrinkage in this specific case leading to deformation of the crest-tape assembly, which would alter the tape planarity. In this respect, to compensate such shrinkage, the molding arrangement uses a particular curvature of longitudinal development within the mold, which besides involving constructional complications to achieve the correct curvature for compensating the shrinkage, does not always ensure perfect tape planarity. In this respect, where the curvature is always the same, the extent of shrinkage can vary on the basis of a plurality of variables in play. The known molding method therefore also offers unreliable repeatability.

SUMMARY OF THE INVENTION

The object of the present invention is to obviate the above drawbacks by providing a gripper loom tape head, the gripper support crest of which can be made of any desired material, i.e., it no longer has to be made of thermoplastic molding material.

This is attained substantially in that thermoplastic molding material is no longer used to create the gripper support crest, but instead, is used as an adhesive for fixing the preformed crest to the tape head.

In this manner, the gripper support crest can be of very simple form, and can be made either of stratified plastic laminate (as is the tape head), or of the actual thermoplastic molding material, such as nylon filled with carbon fibers or any other desired material having the required characteristics. Such a construction also results in greater tape head rigidity, which, as is well known to the expert of the art, is a basic requirement under certain working conditions.

According to one characteristic of the present invention, the prefabricated crest is provided, in proximity to its lower end, with a longitudinal series of through-fixing-holes and is maintained vertical within the closed mold during its fixing so as to substantially extend along the longitudinal axis of the horizontally arranged underlying tape head, and spaced therefrom by a certain gap; moreover the tape head is provided, on one and the other side of its longitudinal axis, with a double longitudinal series of downwardly flared fixing holes for the tape head, and with a flared hole of greater diameter on the longitudinal axis in correspondence with the longitudinal ends of the crest.

In this manner, by surrounding most of the prefabricated crest, by becoming inserted into the holes therein and into the gap between the crest and head, by extending along the upper surface of the tape head and by becoming inserted into the flared holes, a thermoplastic material injected into the mold not only achieves a stable and reliable fixing and a compact structure of as high a rigidity as required, but also, because of the perfect symmetry of the structure and the fact that the thermoplastic molding material is subtended between two rigid elements, namely the crest and the tape head, means that the shrinkage of the thermoplastic material during its solidification does not result in deformation of the assembly, hence ensuring the planarity of the tape head, which remains reliably unaltered with time.

Hence, the method for constructing a tape head comprising creating in the tape head, on one and the other side of its longitudinal axis, a double longitudinal series of flared holes, and two further holes, of greater diameter than the flared holes, on the longitudinal axis in proximity to opposite longitudinal ends of the gripper support crest, placing the tape head into a seat provided in a lower part of an injection mold, fabricating the gripper support crest and forming a series of through fixing holes in a lower end thereof; fixing the prefabricated crest into the seat provided along the longitudinal axis of the tape head in an upper part of the injection mold, in which there is provided a cavity corresponding to an impression of thermoplastic material to be injected into the mold, the crest being fixed in such a manner that when the mold is closed, a lower edge of the mold remains spaced from the underlying tape head; closing the mold and injecting thermoplastic material thereinto, until the cavity, and all of the flared and two further holes as well as the gap, have been filed with thermoplastic material; and awaiting solidification of the material, releasing the gripper support crest from the upper half-mold, and opening the mold.

According to preferred embodiments, the prefabricated gripper support crest is composed of stratified plastic laminate or of thermoplastic material such as nylon filled with carbon fibers.

Finally, according to one characteristic of the present invention, the gripper loom tape head having a flat base and a first plurality of holes therein, the base supporting a prefabricated gripper support crest along a longitudinal axis of the tape head, the gripper support crest having a second plurality of holes arranged along a lower portion of the gripper support crest, transverse to the first plurality of holes; the gripper support crest held in position along the longitudinal axis, spaced from the tape head by thermoplastic material which surrounds a substantial portion of the gripper support crest and which fills the first and second pluralities of holes.

The invention is described in detail hereinafter with reference to the accompanying drawings, which illustrate a preferred embodiment thereof by way of non-limiting example only, in that technical or constructional modifications can be made thereto without leaving the scope of the present invention. Thus, for example, the gap between the gripper support crest and the tape head can be eliminated, the crest hence resting directly on the tape head.

DETAILED DESCRIPTION OF THE DRAWINGS

Figure 1:
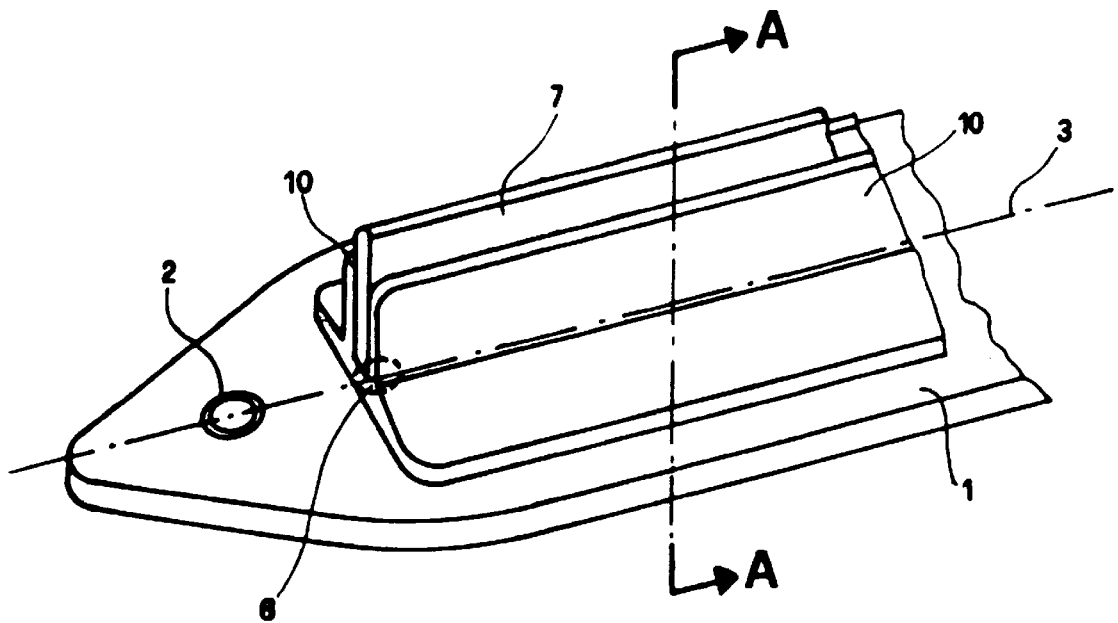
FIG. 1 is a partial perspective view of a tape head formed in accordance with the invention.
Figure 2:
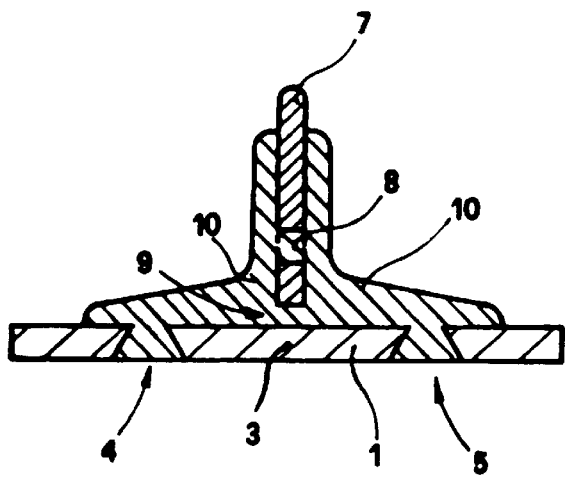
FIG. 2 is a section on the line A—A of FIG. 1.

In the figures, the reference numeral 1 indicates the tape head, generally of stratified plastic laminate, which is provided at its front end with a bush 2 for the attachment of a gripper (not shown), and comprises on one and the other side of its longitudinal axis 3 two longitudinal rows of fixing holes 4 and 5 flared towards the base of the head, as is clearly visible in the figures. The tape head 1 is also provided with two holes, of greater diameter than the holes 4 and 5 (in FIG. 1 the hole 6 is shown dashed, the other being out of the figure) on the longitudinal axis 3 in proximity to the ends of the gripper support crest &. The crest 7, which also acts as a stiffener for the tape head 1, is made of any desired material and preferably of stratified plastic laminate or thermoplastic material, and is provided with a longitudinal series of through-fixing-holes 8 in proximity to its lower end. The gripper support and head stiffening crest 7 is positioned along the longitudinal axis, perpendicular to the underlying tape head 1 with which it forms a gap 9, and is fixed to the head by the thermoplastic molding material 10, for example nylon reinforced with carbon fibers, which surrounds the entire or nearly the entire length of the crest 7 and most of its height, so filling fixing holes 8, the gap 9 and the tape head fixing holes 4, 5 and 6 and extending along the upper surface of the tape head with or without discontinuity (the figures show only the arrangement without discontinuity).

Figure 3:
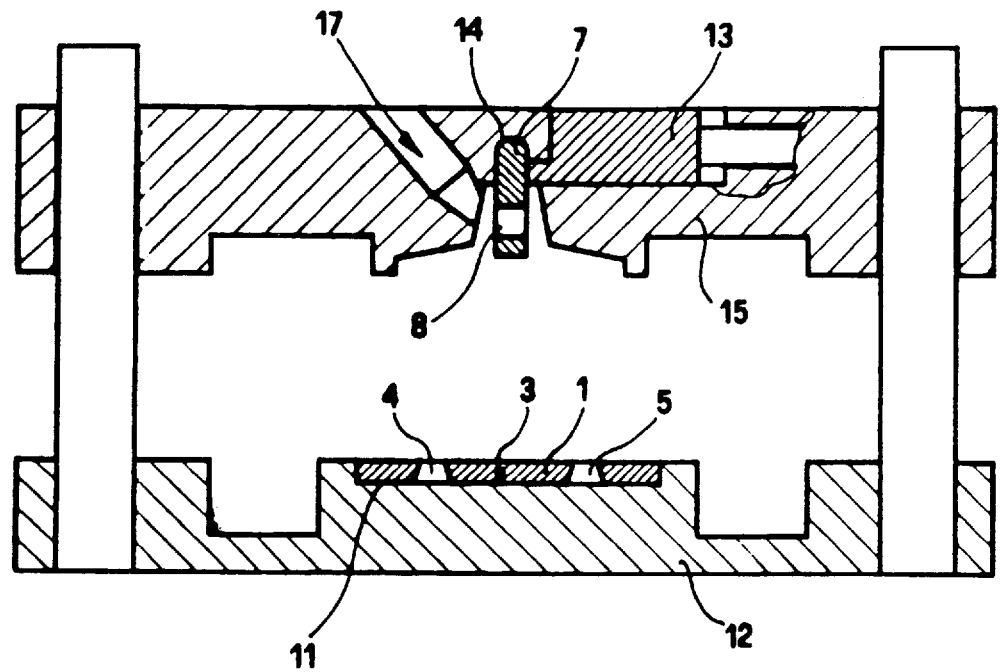
FIGS. 3 and 4 illustrate schematically the method for constructing the tape head according to the invention.
Figure 4:
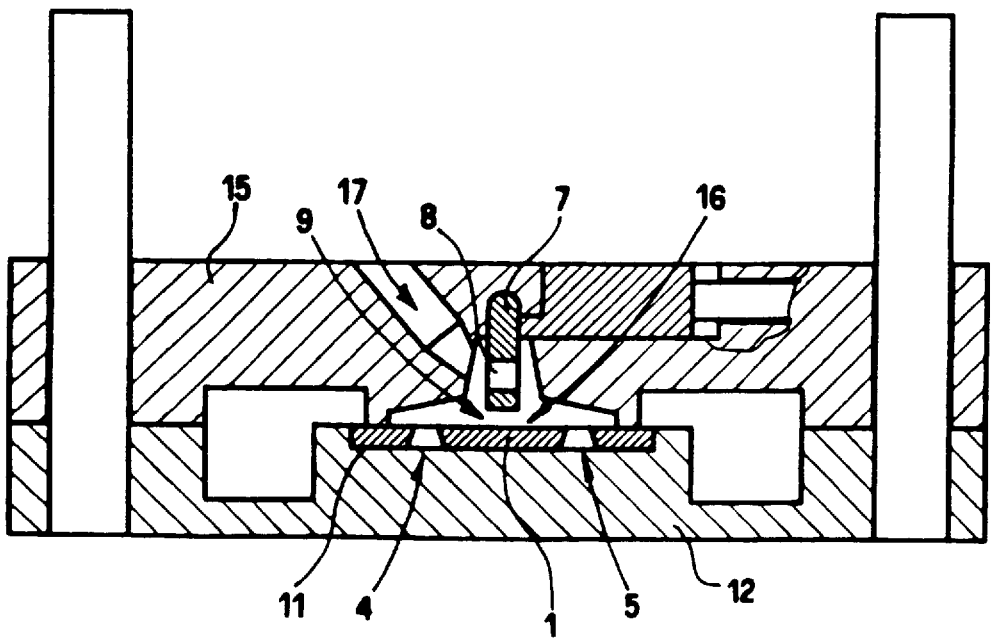

The construction of such a tape head is extremely simple and is shown in FIGS. 3 and 4.

The tape head 1 comprising the holes 4, 5 and 6 is placed in the seat 11 provided in the lower half-mold 12, and the prefabricated crest 7 comprising the holes 8 is fixed by the fixing system 13 into the respective seat 14 provided along the longitudinal axis 3 in the upper half-mold 15, in which there is also provided the cavity 16 corresponding to the impression of the thermoplastic material 10 to be injected, and the two half molds 12 and 15 are closed (see FIG. 4). At this point, the thermoplastic material is injected through the injection channel 17 to fill the cavity 16, including the gap 9 and all the holes. Solidification of the injected material is awaited, after which the fixing system 13 is disengaged, the mold is opened and a tape head is obtained in accordance with the invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gripper loom tape head having a flat base and a first plurality of holes therein, said base supporting a prefabricated gripper support crest along a longitudinal axis of said tape head, said gripper support crest having a second plurality of holes arranged along a lower portion of said gripper support crest, transverse to said first plurality of holes; said gripper support crest held in position along said longitudinal axis, spaced from said tape head by thermoplastic material which surrounds a substantial portion of said gripper support crest and which fills said first and second pluralities of holes.

2. A tape head as claimed in claim 1 wherein said prefabricated gripper support crest is composed of stratified plastic laminate.

3. A tape head as claimed in claim 1 wherein said prefabricated gripper support crest is composed of thermoplastic material.

4. A tape head as claimed in claim 3, wherein said prefabricated gripper support crest is composed of nylon filled with carbon fibers.

5. The gripper loom tape head of claim 1 wherein said first plurality of holes include two rows of holes along either side of said longitudinal axis.

6. The gripper loom tape head of claim 5 wherein holes in said two rows of holes are flared toward said base.

7. The gripper loom tape head of claim 5 wherein said first plurality of holes include two holes arranged along said longitudinal axis, said two holes being larger than holes in said two rows of holes.

8. The gripper loom tape head of claim 1 wherein said gripper support crest is spaced from said flat base by a predetermined gap, said gap filled with said thermoplastic material.

9. A gripper loom tape head having a flat base, said base supporting a prefabricated gripper support crest along a longitudinal axis of said tape head, said gripper support crest having at least one hole in a lower part arranged transverse to said axis; said gripper support crest held in position along said longitudinal axis, spaced from said flat base by thermoplastic material which fills said at least one hole and which surrounds said lower part.

10. The gripper loom tape head of claim 9 wherein said flat base has at least one opening therein, said thermoplastic material also filling said opening.

\* \* \* \* \*